United States Patent
Natsume et al.

(10) Patent No.: US 7,339,518 B2
(45) Date of Patent: Mar. 4, 2008

(54) FMCW RADAR DEVICE AND METHOD FOR DETECTING INTERFERENCE

(75) Inventors: Kazuma Natsume, Obu (JP); Yuu Watanabe, Toyota (JP)

(73) Assignee: DENSO Corporation, Kariya (JP)

( * ) Notice: Subject to any disclaimer, the term of this patent is extended or adjusted under 35 U.S.C. 154(b) by 233 days.

(21) Appl. No.: 11/351,502

(22) Filed: Feb. 10, 2006

(65) Prior Publication Data

US 2006/0181448 A1   Aug. 17, 2006

(30) Foreign Application Priority Data

Feb. 14, 2005  (JP)  ............... 2005-036709

(51) Int. Cl.
*G01S 13/42* (2006.01)
*G01S 13/93* (2006.01)

(52) U.S. Cl. ............ 342/70; 342/192; 342/196; 342/109; 342/111; 342/128; 342/159

(58) Field of Classification Search ............ 342/70–72, 342/59, 99, 109–112, 115, 128–135, 159, 342/192, 196
See application file for complete search history.

(56) References Cited

U.S. PATENT DOCUMENTS

| | | | |
|---|---|---|---|
| RE37,725 E | * | 6/2002 | Yamada ............... 342/72 |
| 6,924,762 B2 | * | 8/2005 | Miyake et al. ............... 342/70 |
| 7,187,321 B2 | * | 3/2007 | Watanabe et al. ............ 342/173 |
| 2001/0015698 A1 | * | 8/2001 | Tokoro ............... 342/70 |
| 2002/0190893 A1 | * | 12/2002 | Akasu ............... 342/70 |
| 2004/0125010 A1 | * | 7/2004 | Natsume et al. ............... 342/70 |
| 2006/0012511 A1 | * | 1/2006 | Dooi et al. ............... 342/70 |
| 2006/0181448 A1 | * | 8/2006 | Natsume et al. ............... 342/70 |
| 2007/0103360 A1 | * | 5/2007 | Nakanishi ............... 342/70 |

FOREIGN PATENT DOCUMENTS

| | | | |
|---|---|---|---|
| JP | 08226963 A | * | 9/1996 |
| JP | 2002-168947 | | 6/2002 |
| JP | 2006220624 A | * | 8/2006 |

* cited by examiner

*Primary Examiner*—John B Sotomayor
(74) *Attorney, Agent, or Firm*—Harness, Dickey & Pierce, PLC

(57) ABSTRACT

An FMCW radar device executes a frequency analysis for a beat signal in a frequency increase interval and a frequency decrease interval, to obtain frequency components in a predetermined high frequency range exceeding a frequency range corresponding to a target detection frequency range within which a target object for detection should be detected. Then the FMCW radar device calculates a value related to a sum of intensities of frequency components within the high frequency range respectively for each of the frequency increase interval and the frequency decrease interval. In the case that one of the calculated integrals is larger than a threshold, the FMCW radar device determines that the FMCW radar device is interfered with by a nearby radar device.

8 Claims, 4 Drawing Sheets

FMCW RADAR DEVICE AND METHOD FOR DETECTING INTERFERENCE

CROSS REFERENCE TO RELATED APPLICATION

This application is based on and incorporates herein by reference Japanese patent application No. 2005-36709 filed on Feb. 14, 2005.

FIELD OF THE INVENTION

The present invention relates to an FMCW (frequency modulated continuous wave) radar device and a method for detecting with high accuracy an occurrence of interference by a radar wave transmitted from another radar device.

BACKGROUND OF THE INVENTION

In JP 2002-168947A, an FMCW radar device for detecting a physical quantity of a target object (e.g., a distance to the target object, or a relative velocity of the target object) also detects in two ways an occurrence of interference by another radar device.

In one way, the FMCW radar device compares, with a predetermined amplitude threshold, amplitude of a reception signal corresponding to a radar wave reflected by the target object or amplitude of a beat signal indicative of a frequency difference between a transmitted radar wave and the reflected radar wave. Then the FMCW radar device determines that the FMCW radar device is interfered with by another radar device, when the amplitude of the reception signal or the amplitude of the beat signal is larger than the predetermined amplitude threshold.

In another way, the FMCW radar device compares a peak frequency of the beat signal with a predetermined frequency threshold corresponding to the farthest end of a target object distance range within which the target object should be detected. The peak frequency of the beat signal is a frequency at which amplitude of the beat signal reaches a local maxim value. Correspondence between a frequency and a distance depends on how the frequency of the transmitted radar wave changes in time. Then the FMCW radar device determines that the FMCW radar device is interfered with by another radar device, when the frequency of the beat signal is higher than the predetermined frequency threshold.

The first way works by virtue of the fact that the interference increases amplitude of the reception signal and the beat signal increases because the FMCW radar device receives a radar wave transmitted from another radar device in addition to the reflected radar wave when the FMCW radar device is interfered with by another radar device.

However, in the case that a target object having a high reflectivity to the radar wave is located close to the FMCW radar device, the FMCW radar device possibly detects the reception signal with amplitude higher than the threshold amplitude. In addition, the amplitude of the reception signal is very high in an extremely low frequency range, because a fraction of the radar wave transmitted from the FMCW radar device always propagates, by diffraction, from an antenna for transmission to an antenna for reception.

It is thus difficult to make, simply based on whether the amplitude of the reception signal or the beat signal is larger than the predetermined amplitude threshold, a determination with high accuracy whether the FMCW radar device is interfered with by another radar device, because there are some causes, as well as the interference, which increase the amplitude of the reception signal.

The second way works by virtue of the fact that the peak frequency of the beat signal tends to be lower than the maximum frequency corresponding to the distance from the FMCW radar device to the farthest end of the target detection distance range, because the peak frequency of the beat signal is basically proportional to the distance to the target object. Thus, the FMCW radar device determines that the beat signal is generated in the existence of the interference by the other radar device, when the frequency of the beat signal is higher than the maximum distance frequency corresponding to the farthest end of the distance range in which the target object should be detected.

In the case that the FMCW radar device is installed in a vehicle, however, it often happens that a building, a large sized vehicle having a load on board or the like is at a location farther than the farthest end of the target detection distance range. If the building, the load, or the like has a wide area which is almost orthogonal to a propagation direction of the radar wave transmitted from the FMCW radar device and is capable of reflecting the radar wave, the FMCW radar device sometimes receives the reflected radio wave from the large obstacle such as the building or the load. The FMCW radar device therefore detects the beat signal having the peak frequency higher than the maximum frequency corresponding to the distance to the farthest end of the target detection distance range.

It is thus not only the interference by another radar device that causes the beat signal to have the peak frequency higher than the maximum frequency corresponding to the distance to the farthest end of the target detection distance range.

It is therefore difficult to make, simply based on whether the peak frequency of the beat signal is higher than the maximum frequency corresponding to the distance to the farthest end of the target detection distance range, a determination with high accuracy whether the FMCW radar device is interfered with by another radar device.

SUMMARY OF THE INVENTION

It is therefore an object of the present invention to provide an FMCW radar device which is capable of determining with high accuracy whether the FMCW radar device is interfered with by another radar device.

An FMCW radar device calculates a value related to a sum of intensities of frequency components of the beat signal, the frequency components within a high frequency range exceeding a frequency range corresponding to a target detection distance range within which the target object is to be detected. Then the FMCW radar device makes, based on the value related to the sum, a determination whether another radar device is interfering with the reflected radio wave.

As described above, in the case that a target obstacle having high reflectivity is at a location farther than the farthest end of the target detection distance range, the FMCW radar device detects a beat signal having a peak frequency higher than a frequency corresponding to the distance to the farthest end of the target detection distance range. Therefore, it is difficult to make, simply based on whether the frequency of the beat signal is higher than the frequency corresponding to the distance to the farthest end of the target detection distance range, a determination with high accuracy whether the FMCW radar device is interfered with by another radar device. However, it is unlikely that many obstacles having high reflectivity are at many locations farther than the farthest end of the target detection distance range.

The FMCW radar device detects a beat signal indicative of a frequency difference between the transmission signal generated by the FMCW radar device and the reception signal generated from the radar wave from another radar device (such as another FMCW radar device, a two-frequency CW type radar device, a multi-frequency CW (Continuous Wave) type radar device, a pulse type radar device, and a spectrum spreading type radar device), if a frequency range of a radar wave transmitted by another radar device is close or identical to the frequency range of the radar wave transmitted and received by the FMCW radar device of the present invention.

It is also very unlikely that two different radar devices transmit radar waves having the same frequency variation, because of the difference in their transmission methods and manufacturers for the radar devices, and even because of individual differences between radar devices of the same type. Therefore, frequency variations of radar waves differ from each other. As a result, the beat signal, which indicates as described above the frequency difference between the transmission signal generated by the FMCW radar device and the reception signal generated from the radar wave from another radar device, has frequency components in a wide frequency range from a low frequency to a high frequency, because the frequencies of this transmission signal and this reception signal vary differently. The wide frequency range includes a frequency range exceeding a frequency range corresponding to the target detection distance range within which the target object should be detected.

Based on the fact, the FMCW radar device of the present invention calculates a value related to a sum of intensities of frequency components of one of the increase interval beat signal and the decrease interval beat signal within a high frequency range exceeding a frequency range corresponding to a target detection distance range within which the target object is to be detected; and makes, based on the value related to the sum, a determination whether a radar device is interfering.

As described above, the beat signal generated by the radar wave from another radar device has the frequency components in the wide frequency range from the low frequency to the high frequency. Therefore, by calculating the value related to the sum, it is possible to determine with high accuracy whether the FMCW radar device is interfered with by another radar device, because it is only the interference by another radar device that increases the value related to the sum by a large amount.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Hereafter, an FMCW radar device according to an embodiment is described with reference to the figures. The FMCW radar device 2 shown in FIG. 1 is installed in a vehicle and detects a distance to a target object (e.g., a preceding vehicle) and/or a relative velocity of the target object such as a preceding vehicle.

Figure 1:
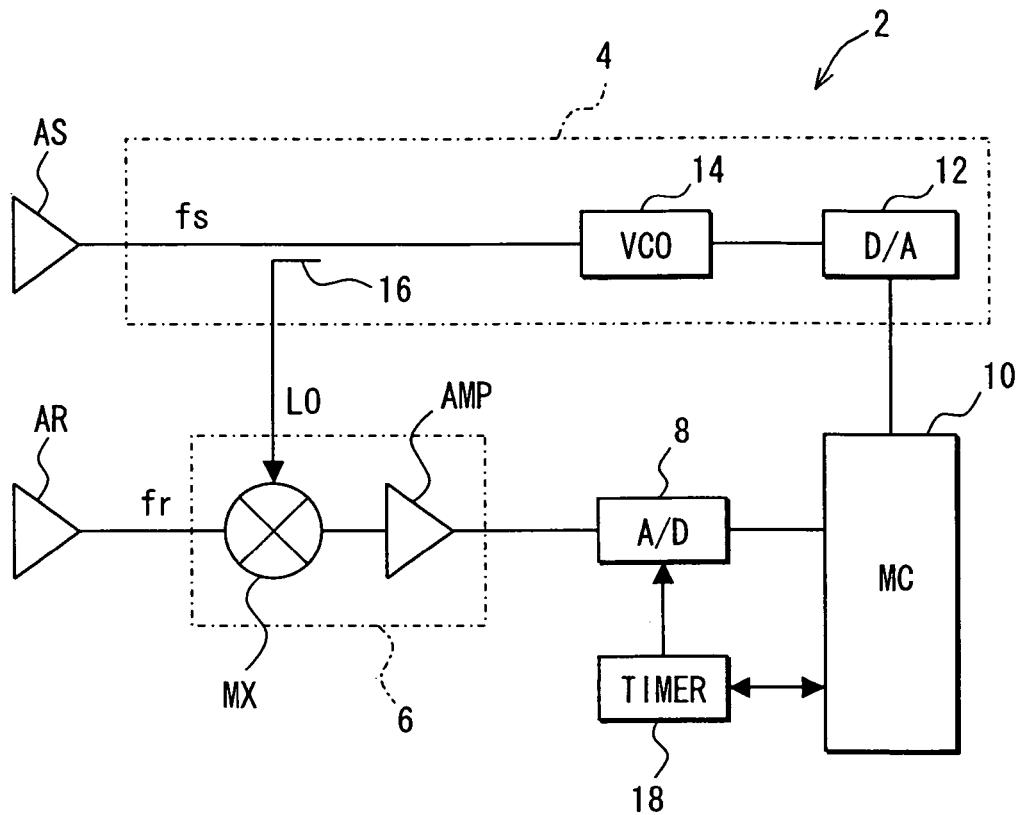
FIG. 1 is a block diagram showing an FMCW radar device according to an embodiment of the present invention.

As shown in FIG. 1, the FMCW radar device 2 includes a transmitter 4, a receiver 6, an A/D converter 8, a microcomputer (MC) 10, a timer 18, and antennas AS and AR.

The transmitter 4 is for transmitting a millimeter radar wave through the antenna AS. It includes a D/A converter 12, a voltage controlled oscillator 14, and a splitter 16. The D/A converter 12 receives from the microcomputer 10 a digital signal a frequency of which is gradually increased and gradually decreased alternately in time, and converts the received digital signal to an analog signal. The voltage controlled oscillator 14 receives the analog signal as a modulation signal and thereby generates a radio frequency signal in a millimeter waveband. The splitter 16 splits the radio frequency signal generated by the voltage controlled oscillator 14 into a transmission signal (i.e., the millimeter radar wave) fs and a local signal L0. The transmission signal fs has a recursively varying frequency determined by the digital signal produced by the microcomputer 10. The transmission signal fs is inputted to the antenna AS and the local signal L0 is inputted to the receiver 6.

The antenna AR receives a reflected radar wave which comes from the target object reflecting the millimeter radar wave transmitted by the antenna AS, and outputs to the receiver 6 a reception signal fr according to the received reflected radar wave.

The receiver 6 includes a mixer MX and an amplifier AMP. The mixer MX mixes the local signal L0 and the reception signal fr from the antenna AR to generate a beat signal corresponding to a frequency difference therebetween. The amplifier AMP amplifies the beat signal generated by the mixer MX.

The beat signal amplified by the amplifier AMP is inputted to the A/D converter 8. The A/D converter 8 collects the beat signal at a timing determined by the timer 18 and converts the collected signal into a digital signal. The digital signal converted from the beat signal is inputted to the microcomputer 10, which uses the inputted signal for calculating the distance and/or the relative velocity.

The timer 18 determines the timing to collect the beat signal, by the A/D converter by outputting to the A/D converter 8 a sampling request signal at every timing when a sampling period expires. The timer 18 starts, by receiving a request for starting detection from the microcomputer 10, recursive detection of expirations of the sampling period, and stops the recursive detection when the number of the expirations reaches a predetermined sampling number.

A sampling frequency may be predetermined by a manufacturer to a value which makes it possible to detect frequency components of the beat signal in a high frequency range corresponding to a long distance range farther than a target detection distance range. The target detection distance range is a distance range within which the distance or the relative velocity of the target object can be detected. The sampling period is predetermined according to the sampling frequency determined for the timer 18.

For example, in the case that the farthest end of the target detection distance range is within a distance from 150 m to 200 m, the sampling frequency is determined so that the frequency components are detected in a frequency range up to a maximum frequency 333 kHz, which corresponds to the distance 512 m in the case that the relative velocity of the target object is zero. More specifically, based on the sampling theorem, the sampling frequency is determined to be equal to or more than twice (i.e. 666 kHz in the above case) the maximum frequency (i.e. 333 kHz in the above case). Thus, it is possible to correctly detect frequency components in the frequency range up to the maximum frequency.

The microcomputer 10 is mainly composed of a CPU, a ROM, and a RAM and calculates based on the digital data from the A/D converter 8 the distance to the target object and/or the relative velocity of the target object. The microcomputer 10 includes a digital signal processor for executing a fast Fourier transform (FFT) process in a frequency analysis process. The calculated distance and the calculated relative velocity are outputted to, for example, a cruise velocity travel controller having a function for controlling the distance to the preceding vehicle and used in, for example, executing the function for controlling the distance.

Hereafter, an operation of the FMCW radar device 2 for detecting the distance and the relative velocity regarding the target object is described.

Figure 2A:
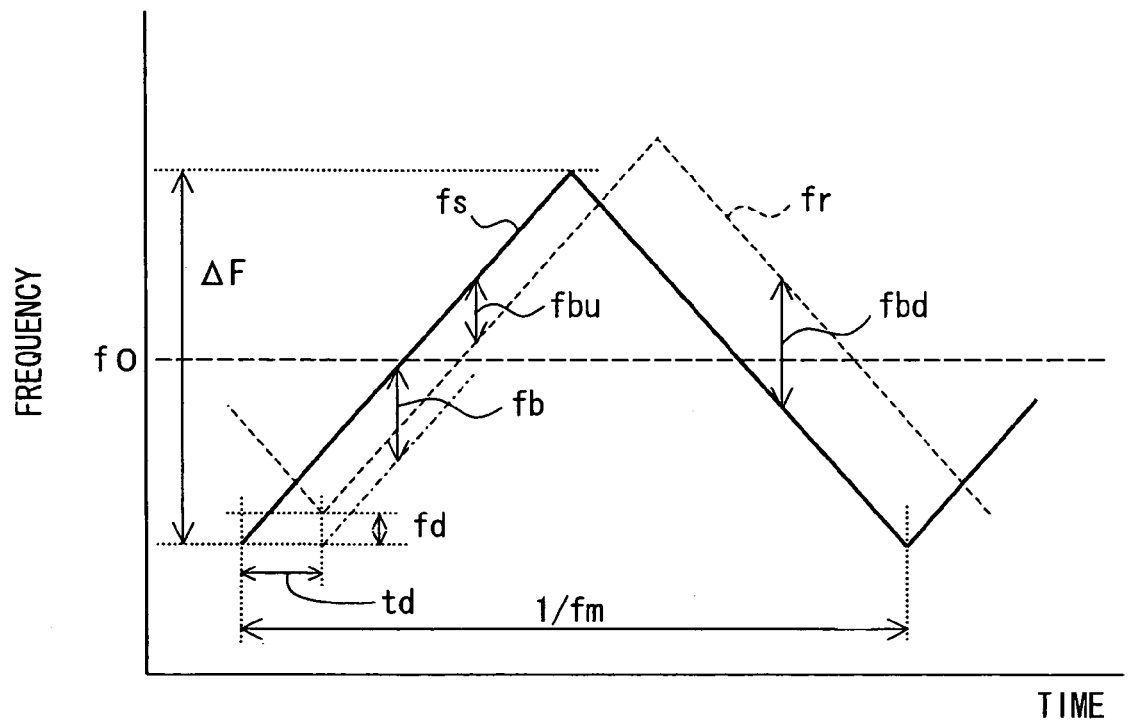
FIG. 2A is a time chart showing a transmission signal fs and a reception signal fr.

As shown in FIG. 2A, the transmitter 4 transmits through the antenna AS the millimeter radar wave, which is a frequency modulated continuous wave (FMCW). In the case that the millimeter radar wave is reflected by the target object, the reflected radar wave is received by the antenna AR. Then, the mixer MX mixes the reception signal fr generated by the antenna AR with the local signal L0 to generate the beat signal indicative of the frequency difference between the reception signal fr and the local signal L0 which is equal to the transmission signal fs.

Figure 2B:
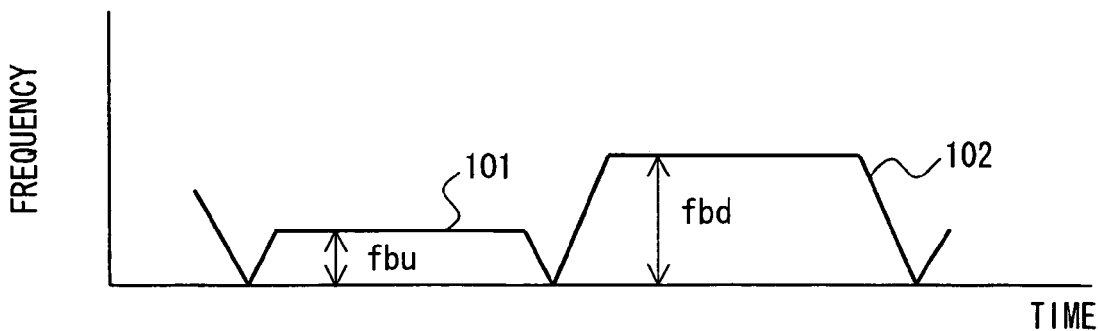
FIG. 2B is a time chart showing a beat frequency corresponding to a frequency difference between the transmission signal fs and the reception signal fr.

The frequency of the transmission signal fs periodically varies, and a period of frequency variation of the transmission signal fs has a frequency increase interval during which the frequency is gradually increased and a frequency decrease interval during which the frequency is gradually decreased. In each of the frequency increase interval and the frequency decrease interval, the A/D converter 8 collects the beat signal recursively at the predetermined sampling period and converts the collected beat signal to the digital signal. Thus, as shown in FIG. 2B, the beat signal 101 in the frequency increase interval and the beat signal 102 in the frequency decrease interval are generated.

In the case that a velocity of the vehicle having the FMCW radar device 2 is equal to a velocity of the target object, that is, in the case that the relative velocity of the target object is zero, the reflected radar wave is retarded by a time which it takes for the radar wave to travel back and forth a distance D between the target object and the FMCW radar device 2. In this case, the reception signal fr is shifted in time by the retarded time td relative to the transmission signal fs, and therefore a peak frequency fbu of the beat signal in the frequency increase interval is equal to a peak frequency fbd of the beat signal in the frequency decrease interval (fbu=fbd).

In the case that the velocity of the vehicle having the FMCW radar device 2 is different from the velocity of the target object, that is, in the case that the relative velocity of the target object is not zero, the reflected radar wave has a Doppler shift. Therefore, the reception signal fr is shifted, relative to the transmission signal fs, in frequency by a frequency fd corresponding to the Doppler shift as well as in time by the retarded time td. In this case, as shown in FIGS. 2A and 2B, the peak frequency fbu of the beat signal 101 in the frequency increase interval is different from the peak frequency fbd of the beat signal 102 in the frequency decrease interval.

Thus, the reception signal fr is shifted, based on the distance D to the target object and the relative velocity V of the target object, in time and frequency, respectively. In other words, a component of the frequency difference between the transmission signal fs and the reception signal fr focused only on the shift in the time axis in FIG. 2A corresponds to the distance D to the target object. In addition, a component of the frequency difference focused only on the shift in the frequency axis in FIG. 2A corresponds to the distance D to the target object. Each of the frequency differences are calculated from the equations (1) and (2) defined below.

$$fb=(|fbu|+|fbd|)/2 \qquad (1)$$

$$fd=(|fbu|-|fbd|)/2 \qquad (2)$$

The calculated frequency differences fb and fd corresponding to the distance D and the relative velocity V can be substituted to the equations (3) and (4) defined below to calculate the distance D and the relative velocity V, $$D=\{C/(4\times\Delta F\times fm)\}\times fb \qquad (3)$$

$$V=\{C/(2\times f0)\}\times fd \qquad (4)$$

where ΔF is a transmission frequency range within which the frequency of the transmission signal fs varies, f0 is a central frequency at the center of the transmission frequency range, fm is the period of frequency variation of the transmission signal, and C is the velocity of light.

Hereafter, a method for determining an occurrence of interference with the FMCW radar device 2 by a radar wave from another radar device is described.

A waveband near 76 GHz is allocated for use to widely-used radar devices (ex. an FMCW radar device, a two-frequency CW type radar device, a multi-frequency CW type radar device, a pulse type radar device, and a spectrum spreading type radar device) which detect a distance or the like to a target object by using a millimeter wave as a radar wave. These radar devices therefore possibly interfere with each other.

Figure 3:
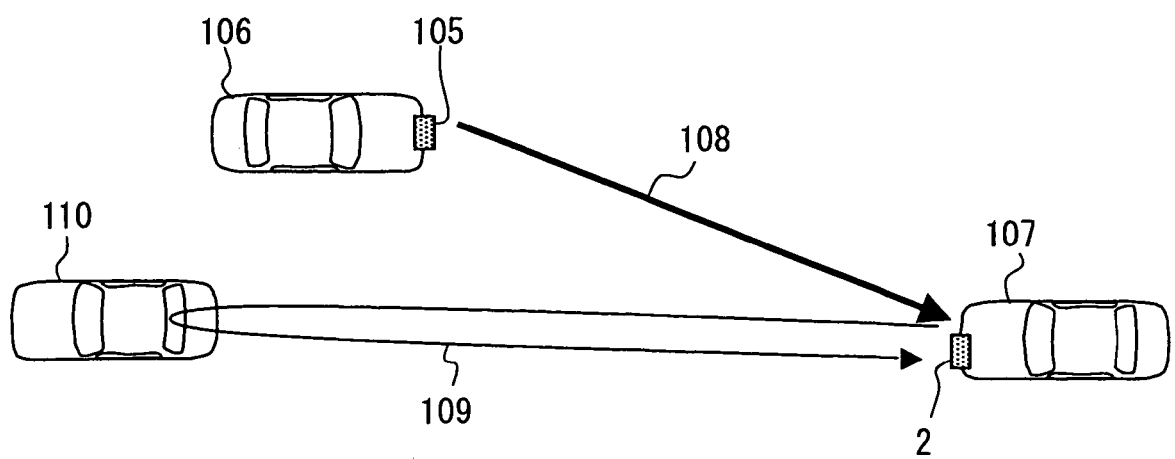
FIG. 3 is a top view showing a situation where interference occurs between the FMCW radar device and another radar device.

For example, in a situation shown in FIG. 3 that a radar device 106 is mounted on an oncoming vehicle 106 coming from the opposite direction to a heading direction of the vehicle 107 having the FMCW radar device 2, the FMCW radar device 2 possibly receives a radar wave 108 transmitted from the radar device 105 mounted on the oncoming vehicle 106 as well as the reflected radar wave 109 transmitted by the FMCW radar device 2 and reflected by the preceding vehicle 110. When the FMCW radar device 2 receives the radar wave 108 transmitted from the radar device 105, the FMCW radar device 2 generates the beat signal indicative of a frequency difference between the reception signal fr corresponding to both the radar wave 108 and the transmission signal fs.

In the case that the frequency of the radar wave 108 is equal to or close to the frequency of the reflected radar wave 109, the beat signal generated according to the reception signal of the radar wave 108 includes a frequency component corresponding to the target detection distance range within which the target object should be detected. Therefore, when a nearby radar device such as the radar device 105 interferes with the FMCW radar device 2, it is difficult to detect correctly the distance to the preceding vehicle 110 or the relative velocity of the preceding vehicle 110 by means of the peak frequency fbu of the beat signal in frequency increase interval and the peak frequency fbd of the beat signal in frequency decrease interval. Thus, it is necessary to detect with a high degree of accuracy the occurrence of the interference by the nearby radar device and to make some measure against the interference.

Figure 4A:
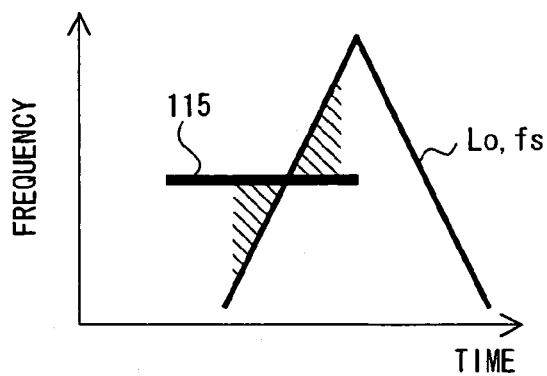
FIG. 4A is a graph showing a situation where another radar device transmits a radar wave at a constant frequency which is within a transmission frequency range of the FMCW radar device.

In the case shown in FIG. 4A, the nearby radar device transmits (like a two-frequency CW type radar device, a multi-frequency CW type radar device, a pulse type radar device, and a spectrum spreading type radar device) the radar wave having a constant frequency, and the constant frequency is within the transmission frequency range within which the frequency of the transmission signal fs of the FMCW radar device 2 varies. In this case, as shown by shades in FIG. 4A, a frequency difference between the local signal L0 (equal to the transmission signal fs) and a reception signal 115 of the radar wave transmitted from the nearby radar device varies between a small value and a large value.

Figure 4B:
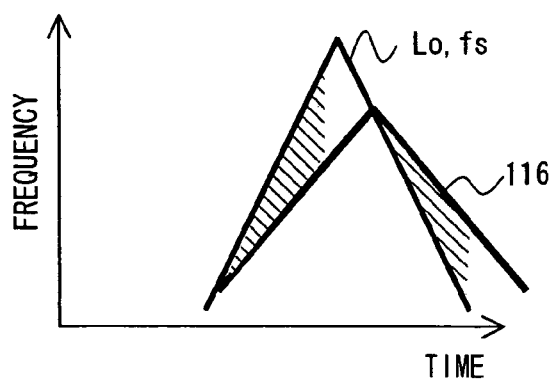
FIG. 4B is a graph showing a situation where another radar device transmits a radar wave at a varying frequency a part of which is within the transmission frequency range of the FMCW radar device.
Figure 4C:
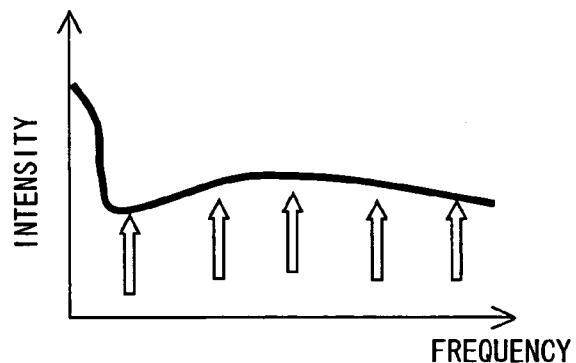
FIG. 4C is a graph showing an influence of interference on a frequency spectrum of a beat signal.

In the case shown in FIG. 4B, the nearby radar device transmits, like another FMCW radar device, the radar wave having a varying frequency, and a part of a range within which this varying frequency varies and a part of the transmission frequency range of the FMCW radar device 2 overlap. In this case, as shown by shades in FIG. 4B, a frequency difference between the local signal L0 and a reception signal 116 of the radar wave transmitted from the nearby radar device also varies between a small value and a large value.

It may happen that the nearby radar device transmits the radar wave having the same frequency variation pattern as the radar wave transmitted by FMCW radar device 2, that is, it may happen that change rate of the frequency of the radar wave from the nearby radar device is almost the same as that of FMCW radar device 2 and that the frequency increase interval and the frequency decrease interval of the radar wave from the nearby radar device are almost synchronized with those of the FMCW radar device 2. In this case, a frequency difference between the local signal L0 and a reception signal of the radar wave transmitted from the nearby radar device becomes nearly unchanged in time. Therefore in this case, the beat signal has its peak value in a narrow waveband area.

It is, however, unlikely that two different radar devices transmit radar waves having the same frequency variation pattern, because of the difference in their transmission methods and manufacturers between the radar devices, and even because of individual differences between radar devices of the same type. Therefore, the change rates of the frequencies of the radar waves from two different radar devices are different, and the frequency increase intervals and the frequency decrease intervals of the radar waves from the different radar devices do not synchronize each other. As a result, the frequency difference between the local signal L0 and the reception signal of the radar wave transmitted from the nearby radar device varies between a small value and a large value depending on the difference in the frequency variations between the nearby radar device and the FMCW radar device 2.

In both the cases shown in FIGS. 4A and 4B, the beat signal has frequency components in a wide frequency range from a low frequency to a high frequency, because the frequency difference between the local signal L0 and the reception signal from the nearby radar device varies, as described above, from a small value to a large value. Therefore, when the FMCW radar device 2 is interfered with by the nearby radar device, a frequency spectrum of the beat signal obtained through a frequency analysis process (specifically, a fast Fourier transform) has intensities which are enhanced, because of the interference, in the wide frequency range. In the beat signal, frequency components with the enhanced intensities of the beat signal include frequency components in a frequency range higher than a target detection frequency range which corresponds to the target detection distance range within which the target object should be detected.

Figure 5:
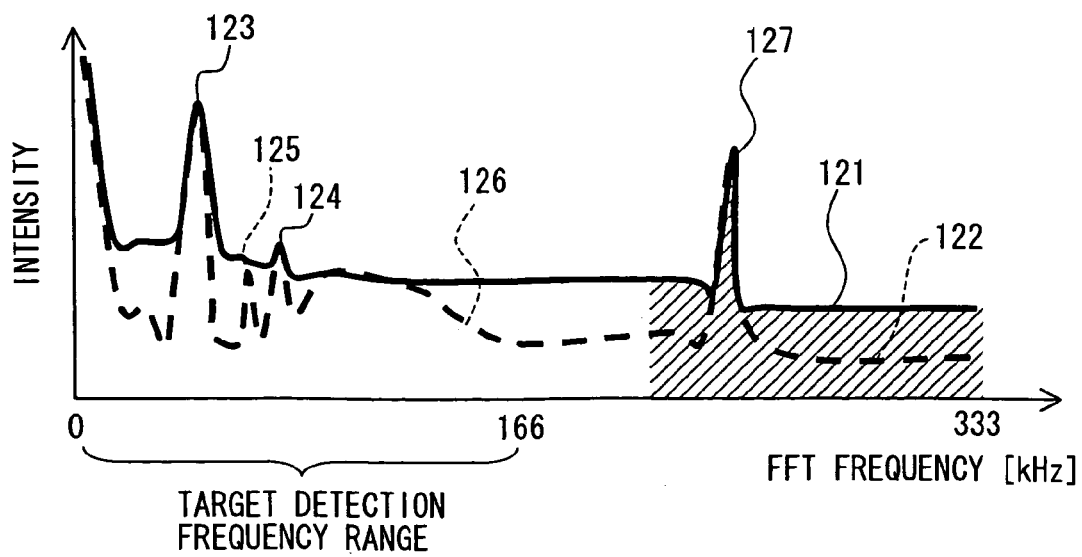
FIG. 5 is a graph showing an example of the frequency spectrum of the beat signal in a time period where a transmission frequency increases or decreases, in the case that the FMCW radar device is installed in a vehicle.

A solid line 121 and a dashed line 122 in FIG. 5 show the frequency spectrum of the beat signal in the frequency increase interval or the frequency decrease interval in the case that the FMCW radar device 2 is installed in the vehicle. More specifically, the solid line 121 shows the frequency spectrum in the case that the FMCW radar device 2 is interfered with by the nearby vehicle and the dashed line 122 shows the frequency spectrum in the case that the FMCW radar device 2 does not suffer from the interference.

As shown in FIG. 5, in the case that preceding vehicles are in the target detection distance range, the spectrums 121 and 122 show peaks 123, 124 and 125, the frequencies of which depend on the distances and the relative velocities of the preceding vehicles.

Figure 6:
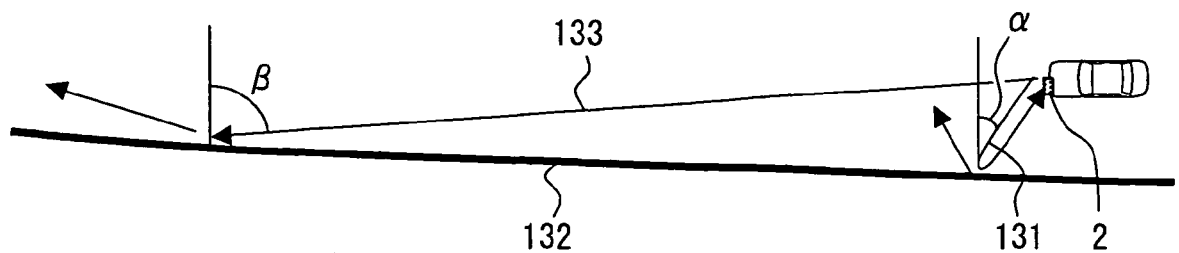
FIG. 6 is a top view showing a situation where the frequency spectrum of the beat signal is affected by existence of an object (e.g., a crash barrier) along a road.

If a long obstacle such as a crash barrier or a side wall of a tunnel extends along a periphery of a road, a portion of the long obstacle in the target detection distance range of the FMCW radar device 2 reflects, in the direction toward the FMCW radar device 2, the radar wave transmitted by the FMCW radar device 2, because, as shown in FIG. 6, the transmitted radar wave 131 travels onto the portion of the long obstacle 132 with a relatively small angle of incidence α (i.e., an angle of incidence relatively close to the orthogonal angle perpendicular to the direction of the long obstacle 132). Therefore, the spectrum 122 free from the interference has frequency components 126 with enhanced intensities in a relatively wide frequency range.

On the other hand, as shown in FIG. 5, frequency components in a high frequency range which corresponds to a far distant area farther than the target detection distance area are not enhanced, even if the long obstacle such as the crash barrier is in the far distant area of the FMCW radar device 2.

This comes from the fact that, as shown in FIG. 6, the transmitted radar wave 133 travels onto another portion of the long obstacle 132 at the long distance area with a relatively large angle of incidence β (i.e., an angle of incidence relatively close to the angle parallel to the long obstacle 132). Therefore, the portion of the long obstacle 132 at the long distance area reflects, not in the direction toward the FMCW radar device 2 but in another direction, the radar wave 133 transmitted by the FMCW radar device 2.

A building, a large sized vehicle having a load on board, or the like may be at a place farther than the target detection distance range of the FMCW radar device 2. Further, the building, the load, or the like may have a wide surface area which is almost orthogonal to a propagation direction of the radar wave transmitted from the FMCW radar device 2 and is reflective to the radar wave. In this case, the FMCW radar device 2 sometimes receives the reflected radio wave from a large obstacle such as the building, the load, or the like, and frequency components 127 in a very narrow frequency range corresponding to the distance and the relative velocity of the large obstacle are enhanced in their intensities.

The above facts indicate that it is only when the FMCW radar device 2 is interfered by the interference from the nearby radar device that the frequency components within the high frequency range corresponding to the distance range farther than the target detection distance range are enhanced, as shown in FIG. 6, as a whole in their intensities. When the FMCW radar device 2 executes the frequency analysis process for the beat signal, the FMCW radar device 2 detects the intensities of the frequency components (i.e., the frequency spectrum) of the beat signal in the high frequency range corresponding to the distance range farther than the target detection distance range, and calculates an integral of the intensities of the frequency components in the high frequency range. By using the integral, it is possible to determine whether the intensities of the frequency components in the high frequency range is enhanced as a whole, and thereby to correctly determine whether the FMCW radar device is interfered with by the nearby radar device.

Figure 7:
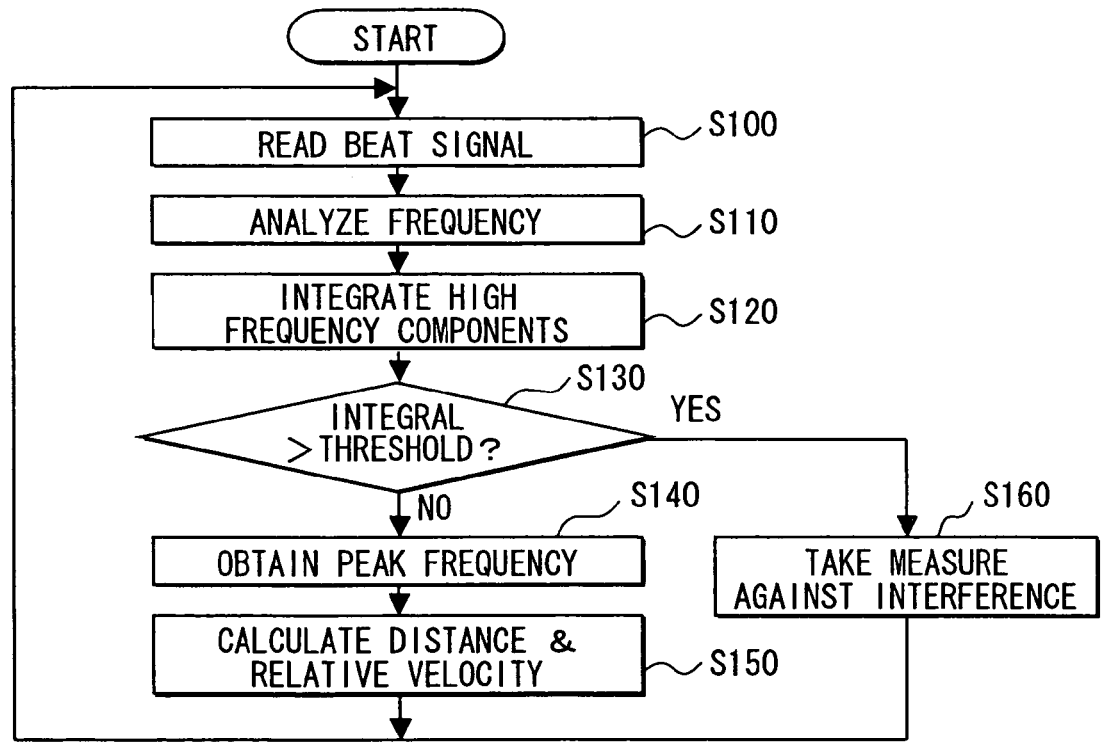
FIG. 7 is a flowchart showing a process for detecting a target, including a process for determining an occurrence of the interference.

Hereafter, a process for detecting the target object including the process for determining the occurrence of the interference is described with reference to a flowchart in FIG. 7.

First, the microcomputer 10 of the FMCW radar device 2 reads at a step S100 digital data to which the A/D converter 8 has converted the beat signal outputted from the receiver 6. The digital data of the beat signal is read and stored temporally in the RAM at the predetermined sampling frequency for the predetermined sampling number of times in each of the frequency increase interval and the frequency decrease interval.

Subsequently in a step S110, the microcomputer 10 executes the frequency analysis process (specifically, first Fourier transform) for each of the digital data in the frequency increase interval and the frequency decrease interval stored in the RAM. As a result of the fast Fourier transform, complex vectors corresponding to respective frequencies are obtained. An absolute value of each of the complex vectors indicates amplitude (i.e., an intensity) in the corresponding frequency. Thus, by means of the fast Fourier transform, data for the frequency spectrum of the beat signal is obtained which indicate intensities of the beat signal for respective frequencies. The frequency analysis process is made separately for the beat signal in the frequency increase interval and the beat signal in the frequency decrease interval.

Subsequently at a step S120, the microcomputer 10 integrates intensities of frequency components within a predetermined high frequency range separately for each of the frequency increase interval and the frequency decrease interval. In the case shown in FIG. 5 where the upper limit of the target detection frequency range is set to 166 kHz which corresponds to 256 m when the relative velocity of the preceding vehicle is zero, the predetermined high frequency range is set to be from 200 to 333 kHz, which is shown by the shade in FIG. 5.

Subsequently at a step S130, the microcomputer 10 makes a determination whether the integrals for the frequency increase interval and the frequency decrease interval of the intensities of the beat signal in the high frequency range are larger than an interference threshold, which is a threshold for determining the occurrence of the interference by the nearby radar device. For the determination at the step S130, obtaining and comparing the interference threshold with one of the integrals for the frequency increase interval and the frequency decrease interval is sufficient.

When the determination of the step S130 is affirmative, the microcomputer 10 subsequently executes a step S160 to take a measure against the interference by the nearby vehicle.

Specifically, the microcomputer 10 may execute, as the measure, a process (specifically a frequency hopping) to shift the transmission frequency range so that the transmitter 4 transmits the radar wave with frequencies different from the frequencies used by the interfering nearby radar device. The microcomputer 10 may otherwise execute, as the measure, a process (specifically a polarization surface change) to rotate the antennas AS and AR by 90 degrees so as to decrease sensitivity of the antennas AS and AR to the radar wave from the interfering nearby radar device. The microcomputer 10 may otherwise execute, as the measure, a process to stop detecting the distance and the relative velocity of the target object and warn a driver accordingly.

When the determination at the step S130 is negative, the microcomputer 10 subsequently executes a step S140. At the step S140, the microcomputer 10 obtains peak frequencies in the frequency increase interval and the frequency decrease interval, respectively. More specifically, the microcomputer 10 specifies all peak frequencies in the data for the frequency spectrum of the beat signal in the frequency increase interval and the frequency decrease interval.

At step S150, the microcomputer 10 calculates the distance D and the relative velocity V of the target object, by using the equations (1) to (4) based on the peak frequencies in the frequency increase interval and the frequency decrease interval. If each of the frequency increase interval and the frequency decrease interval includes multiple peak frequencies, the microcomputer 10 makes, based on change of circumstances in time, pairs each having a peak frequency in the frequency increase interval and a peak frequency in the frequency decrease interval. Then the microcomputer 10 calculates based on the pairs the distances D and the relative velocities V of the respective target objects.

In this embodiment, when the microcomputer 10 executes the process for the fast Fourier transform of the beat signal in the frequency increase interval and the frequency decrease interval, the microcomputer 10 calculates the frequency components in the high frequency range corresponding to the long distance range farther than the target detection distance range within which the target object should be detected. The FMCW radar device 2 has the function for the process for the Fourier transform for obtaining the peak frequencies of the beat signal in the frequency increase interval and the frequency decrease interval. Thus, the intensities of the frequency components in the high frequency range are obtained by utilizing the function the FMCW radar device 2 already has. As a result, the FMCW radar device 2 can be manufactured in a simple structure, because it is not necessary to implement separately the function for the Fourier transform and the function for obtaining the intensities for the frequency components in the high frequency range.

The present invention should not be limited to the embodiment discussed above and shown in the figures, but may be implemented in various ways without departing from the spirit of the invention.

For example, a value related to a sum for making a determination whether the frequency components in the high frequency range is enhanced in their intensities as a whole is not limited to the integrals of the intensities of the frequency components within the predetermined high frequency range.

Figure 8:
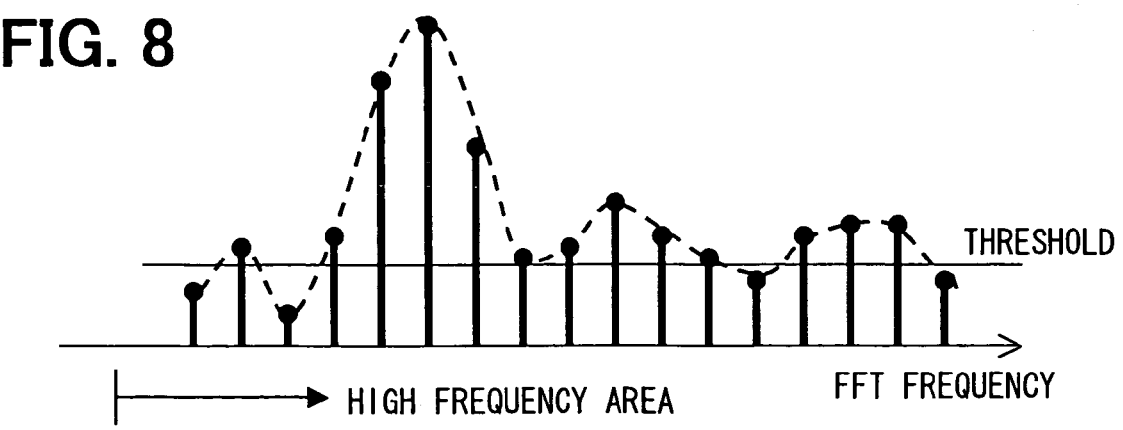
FIG. 8 is a graph showing a frequency spectrum in modification of the embodiment.

The value related to the sum may be the number of frequency components which are in the predetermined high frequency range and have an intensity exceeding a predetermined intensity threshold. In the case that the fast Fourier transform is made, the intensities of the frequency components may be discretely obtained with a frequency resolution depending on the predetermined sampling number, as shown in FIG. 8. The microcomputer 10 may determine that the frequency components in the high frequency range is enhanced as a whole due to the interference by the nearby vehicle, when the number of frequency components having an intensity exceeding the predetermined intensity threshold becomes more than a predetermined number (e.g., a half of the number of the all obtained frequency components). The predetermined intensity threshold may be set to be an intensity value which cannot be reached if not for the interference by the nearby radar device.

When in all the frequency components in high frequency range are enhanced as a whole by the interference by the nearby radar device, the number of frequency components having an intensity exceeding the predetermined intensity threshold increases. Therefore, the FMCW radar device 2 with the modification can determine with high accuracy the occurrence of the interference by the radar wave transmitted from another radar device.

In addition, the FMCW radar device 2 may include a band-pass filter or high-pass filter for passing signals with a frequency exceeding the target detection frequency range which corresponds to the target detection distance range within which the target object should be detected. Then the microcomputer 10 may execute the frequency analysis process for a signal which has passed through the high-pass filter or the band-pass filter, and calculate intensities for frequency components in the high frequency range. Moreover, the microcomputer 10 may obtain the value related to the sum of intensities of frequency components within the high frequency range by calculating a sum of the calculated intensities for frequency components in the high frequency range or by specifying the number of frequency components which are in the high frequency range and are higher than the predetermined intensity threshold.

The FMCW radar device 2 may have multiple antennas AR for receiving a radar wave, and the antennas AR may be arranged in a horizontal line. Then the microcomputer 10 may detect a direction of the target object by calculating the differences in amplitude or phase among the reflected waves received by the multiple antennas AR. In this case, the FMCW radar device 2 may have multiple receivers 6, the total number of which is as many as the number of the multiple antennas AR. In the case that the FMCW radar device 2 has only a single receiver 6, the FMCW radar device 2 may have a switching device for connecting the receiver 6 with each of the antennas AR at a time in a time division manner.

In the case that the FMCW radar device 2 includes multiple antennas AR for receiving a radar wave, the microcomputer 10 may use a beat signal generated from a reception signal outputted by one of the antennas AR in order to determine whether the FMCW radar device 2 is interfered with by the nearby radar device. Otherwise, the microcomputer 10 may calculate an average of the beat signals generated from the reception signals outputted by all of the antennas AR and use the calculated average spectrum data in order to determine whether the FMCW radar device 2 is interfered with by the nearby radar device.

What is claimed is:

1. An FMCW radar device, comprising:
    a transmission signal generation unit for generating a transmission signal at a frequency increasing in a first interval and decreasing in a second interval;
    a radar wave transmission unit for transforming the transmission signal into a transmission radar wave and for transmitting the transmission radar wave;
    a reception unit for receiving a reflected radio wave coming from a target object reflecting the transmission radar wave and for generating a reception signal from the reflected radio wave;
    a beat signal generation unit for generating a first interval beat signal and a second interval beat signal, the first interval beat signal indicating a frequency difference between the transmission signal and the reception signal in the first interval, the second interval beat signal indicating a frequency difference between the transmission signal and the reception signal in the second interval;
    a frequency analysis unit for specifying, by executing frequency analysis, a first peak frequency of the first interval beat signal and a second peak frequency of the second interval beat signal, wherein amplitude of the first interval beat signal reaches a local maximum at the first peak frequency and amplitude of the second interval beat signal reaches a local maximum at the second peak frequency;
    a distance/velocity calculation unit for calculating based on the first and second peak frequencies a distance to the target object from the FMCW radar device and a relative velocity of the target object to the FMCW radar device;
    a sum calculation unit for calculating a value related to a sum of intensities of frequency components of one of the first interval beat signal and the second interval beat signal, the frequency components within a high frequency range exceeding a frequency range corresponding to a target detection distance range within which the target object is to be detected; and
    a determination unit for making, based on the value related to the sum, a determination whether another radar device is interfering with the reflected radio wave.

2. The FMCW radar device according to claim 1, wherein:
    the frequency analysis unit specifies, by executing frequency analysis for one of the first interval beat signal and the second interval beat signal, the frequency components of the one of the first interval beat signal and the second interval beat signal; and
    the sum calculation unit calculates, as the value related to the sum, an integral of intensities of the frequency components specified by the frequency analysis unit.

3. The FMCW radar device according to claim 1, wherein:
the frequency analysis unit specifies, by executing frequency analysis for one of the first interval beat signal and the second interval beat signal, the frequency components of the one of the first interval beat signal and the second interval beat signal; and
the sum calculation unit calculates, as the value related to the sum, a number of the frequency components specified by the frequency analysis unit, each of the frequency components having an intensity larger than a predetermined intensity threshold.

4. The FMCW radar device according to claim 2, wherein the frequency analysis unit includes an A/D converter for collecting the first interval beat signal and the second interval beat signal and for converting each of the collected beat signals into a digital signal recursively at a predetermined sampling period, wherein the predetermined sampling period is two or more times as large as the upper limit of the high frequency limit.

5. The FMCW radar device according to claim 1, wherein the sum calculation unit selects a part of the one of the first interval beat signal and the second interval beat signal, the part being within the high frequency range, and calculates, as the value related to the sum, an integral of intensities of frequency components included in the part.

6. The FMCW radar device according to claim 1, wherein the sum calculation unit selects a part of the one of the first interval beat signal and the second interval beat signal, the part being within the high frequency range, and calculates, as the value related to the sum, a number of frequency components each of which is included in the part and has an intensity larger than a predetermined intensity threshold.

7. An FMCW radar device, comprising:
a transmission signal generation unit for generating a transmission signal at a varying frequency;
a radar wave transmission unit for transforming the transmission signal into a transmission radar wave and for transmitting the transmission radar wave;
a reception unit for receiving a reflected radio wave coming from a target object reflecting the transmission radar wave and for generating a reception signal from the reflected radio wave;
a beat signal generation unit for generating a beat signal indicating a frequency difference between the transmission signal and the reception signal;
a frequency analysis unit for specifying, by executing frequency analysis, a peak frequency of the beat signal, wherein amplitude of the beat signal reaches a local maximum at the peak frequency;
a target object detection unit for detecting based on the peak frequency an existence of the target object;
a sum calculation unit for calculating a value related to a sum of intensities of frequency components of the beat signal, the frequency components within a high frequency range exceeding a frequency range corresponding to a target detection distance range within which the target object is to be detected; and
a determination unit for making, based on the value related to the sum, a determination whether another radar device is interfering with the reflected radio wave.

8. A method for detecting interference with an FMCW radar device by another radar device, comprising:
transmitting a radar wave at varying frequency from the FMCW radar device;
receiving at the FMCW radar device a reflected radio wave coming from a target object reflecting the transmission radar wave;
generating a beat signal indicating a frequency difference between the transmission radar wave and the reflected radio wave;
specifying a peak frequency of the beat signal, wherein amplitude of the beat signal reaches a local maximum at the peak frequency;
detecting based on the peak frequency an existence of the target object;
calculating a value related to a sum of intensities of frequency components of the beat signal, the frequency components within a high frequency range exceeding a frequency range corresponding to a target detection distance range within which the target object is to be detected; and
making, based on the value related to the sum, a determination whether another radar device is interfering with the reflected radio wave.

* * * * *